United States Patent [19]

Mazumder

[11] Patent Number: 5,148,128
[45] Date of Patent: Sep. 15, 1992

[54] RF DIGITAL PHASE SHIFT MODULATORS

[75] Inventor: Shamsur R. Mazumder, Northborough, Mass.

[73] Assignee: Raytheon Company, Lexington, Mass.

[21] Appl. No.: 782,932

[22] Filed: Oct. 25, 1991

[51] Int. Cl.⁵ .................................. H04L 27/00
[52] U.S. Cl. ........................ 332/103; 375/67
[58] Field of Search ............. 332/103; 375/52, 55, 375/67

[56] References Cited

U.S. PATENT DOCUMENTS

| 3,371,284 | 2/1968 | Engelbrecht. | |
| 3,973,201 | 8/1976 | Andren | 375/67 |
| 4,021,758 | 5/1977 | Standing | 375/67 |
| 4,583,061 | 4/1986 | O'Shea. | |
| 4,843,352 | 6/1989 | Kamisaka et al. | 375/67 X |
| 5,081,433 | 1/1992 | Erickson et al. | 332/103 |

*Primary Examiner*—Robert J. Pascal
*Attorney, Agent, or Firm*—Denis G. Maloney; Richard M. Sharkansky

[57] ABSTRACT

A BPSK (Binary-Phase-Shift-Keying) modulator having reduced amplitude and phase errors includes two non-ideal N°-bit phase shifters disposed between two 3dB quadrature couplers to perform out-of-phase combining. When the two phase bits are alternately switched between a reference state and a signal state being N° out of phase with respect to the reference by the cancellation, a 180° binary phase shift keying modulator having reduced amplitude and phase errors relative to the individual phase shifters is provided.

9 Claims, 6 Drawing Sheets

REFERENCE STATE OF DIGITAL BPSK MODULATOR

REFERENCE STATE SIGNAL GENERATION

*Fig. 3B*

180° STATE SIGNAL GENERATION

RF DIGITAL PHASE SHIFT MODULATORS

BACKGROUND OF THE INVENTION

This invention relates generally to phase shift modulators and more particularly to digital binary phase shift key (BPSK) modulators.

As is known in the art, phase modulation, sometimes referred to as phase shift keying, is one technique available for communicating data over information channels. In some applications, phase shift keying has the advantage of requiring less peak power than multi-level amplitude modulation and may have a reduced bandwidth requirement when compared to frequency modulation. Phase modulation techniques have been successfully employed to transmit digital data over high-frequency channels where fading and multipath phenomena are often encountered. In these applications, information is conveyed in the form of phase differences between successive radio frequency pulses.

The simplest technique of phase modulation is called binary phase shift keying for modulating between two states where the phase difference between the two states is generally 180°. Accordingly, a 180° phase shifter is most often used as a BPSK modulator.

There are many types of phase shifters including switched line, reflection, loaded line, and high pass/low pass phase shifters.

A switched-line phase shifter generally makes use of a pair of single pole double throw (SPDT) switches for switching between two separate transmission line paths. The first path has a transmission line length l, while the second path has a transmission line length l+Δl for providing a phase delay longer than the first path given by $$\Delta\phi = 2\pi l/\lambda$$

It is important to note that the phase shift varies as a function of wavelength and accordingly is not constant over frequency.

Another type of phase shifter used in many modulator applications is the reflection phase shifter which includes a switching diode used to switch between a pair of reflective loads for providing signals having a difference in phase shift. A duplexer circuit, often a ferrite circulator, is used to provide the input signal and for extracting the phase shifted output signal. The diode, usually a PIN diode, switches a signal between two low loss impedances to provide signals having a differential phase shift.

The high pass/low pass phase shifter is often used in applications requiring broadband performance and compact size. In the high pass/low pass phase shifter configuration, the low pass filter section includes series inductors and shunt capacitors for providing phase delay to signals passing therethrough. Conversely, the high pass filter is comprised of series capacitors and shunt inductors for providing phase advance to the signals. The switch elements permit switching between the low pass and high pass sections, to provide a compact phase shifter having broader band performance than the previously mentioned reflection, switched-line or loaded line type phase shifters.

The insertion loss and differential phase shift errors of the above described phase shifter configurations limit the bandwidth over which these phase shifters may be used. Although, monolithic microwave integrated circuit implementations generally provide better insertion loss and phase shift error characteristics than hybrid circuit arrangements and lower variations in electrical characteristics from unit to unit, the errors still limit the operating bandwidth of these circuits.

For example, the above described high pass/low pass phase shifters may be provided as a monolithic microwave integrated circuit (MMIC) since the switch elements are typically fabricated from FET devices such as MESFETs. Typical small-sized MMIC high/low pass type phase shifting networks having nominal 180° bit phase shift have insertion loss errors as high as ±1 dB and differential phase shift errors of 180°±25° over the 6-18 GHz frequency range. In applications requiring multi-octave bandwidths these insertion loss and phase shift errors are still considered to be too large for many communication and electronic countermeasure (ECM) systems.

SUMMARY OF THE INVENTION

In accordance with the present invention, a digital modulator includes signal dividing means, for providing first and second signal paths having a differential phase shift of substantially 90° between the signal paths. The modulator further includes first phase shifting means disposed in the first path, for providing a selectable differential phase shift characteristic to the first path. The digital modulator further includes second phase shifting means, disposed in the second path for providing a selectable differential phase shift characteristic to the second path. The modulator further includes signal combining means, coupled to the first and second phase shifting means, and disposed in the first and second signal paths, for combining the first and second signal paths with a differential phase shift of substantially 90° therebetween. The coupling means is coupled to the first and second signal paths such that the 90° differential phase shift of the combining means is in the same signal path as the 90° differential phase shift of the dividing means. With such an arrangement, a digital modulator which provides two states having a differential phase of 180° over a broad range of operating frequencies is provided. Phase shift errors provided by the first and second phase shifting means are substantially canceled with this digital modulator arrangement. Amplitude errors provided by variation in the insertion loss of the phase shifters are also substantially canceled with this arrangement. Thus, the 180° differential phase shift is maintained over a broad range of frequencies. The first and second phase shift means are responsive to a pair of control signals. In response to a first state of said control signals, the first and second phase shift means provides a first differential phase shift characteristic to the first and second signal paths establishing a first phase characteristic of the modulator. In response to a second state of the control signals, the first and second phase shift means provide a second phase shift characteristic to the first and second signal paths establishing a second phase characteristic of the modulator which is 180° out of phase with the first phase shift characteristic provided that the first and second phase shift means provide non-zero, differential phase shifts between the first and second states of the control signals.

BRIEF DESCRIPTION OF THE DRAWINGS

The foregoing features of this invention, as well as the invention itself, may be more fully understood by the following detailed description of the drawings, in which.

DESCRIPTION OF THE PREFERRED EMBODIMENTS

Figure 1:
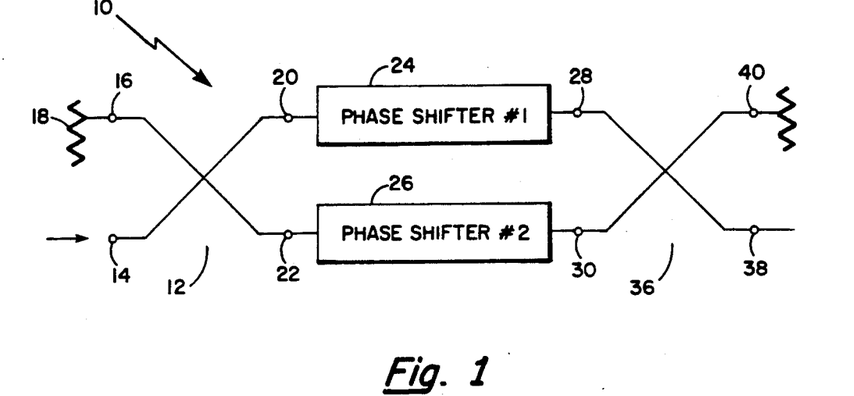
FIG. 1 is a schematic diagram of a digital binary phase shift keying modulator in accordance with the present invention.

Referring now to FIG. 1, a binary phase shift key (BPSK) digital modulator 10 is shown to include a first quadrature hybrid circuit 12, here a quadrature hybrid divider having an input port 14 coupled to an input terminal of the modulator 10 and an isolated port 16 coupled to a termination 18 for absorbing reflected signals received at the isolated port. The hybrid divider 12 is here, a 3 dB quadrature hybrid coupler circuit providing a pair of signal paths at output ports 20, 22 which are out of phase by 90°.

The divider 12 has a pair of output ports 20, 22, each output port coupled to an input terminal of a pair of phase shifter circuits 24, 26, respectively.

Each phase shifter circuit 24, 26 which can be any known type of phase shifter has an output terminal 28, 30 for feeding a pair of input terminals of a second quadrature hybrid circuit 36.

The second quadrature hybrid circuit, here a combiner circuit 36, preferably has corresponding identical characteristics as divider 12 for reasons to be discussed later. The divider 36 has a pair of input terminals 28, 30 and a pair of output terminals 38, 40. Terminal 38 provides an output terminal for the modulator 10 whereas terminal 40 provides a terminated port. Signals provided to input terminals 28 and 30 are combined in quadrature and fed to output terminal 38.

An ideal binary phase shift key modulator changes the transmission phase shift of a signal from a reference phase (0° position) to an opposite phase (180° position) in a periodic manner corresponding to a predetermined modulation frequency. Further, the insertion loss of the ideal BPSK modulator is equal in the two phase states, resulting in complete suppression of the carrier signal of the binary phase shift key spectrum.

Figure 1A:
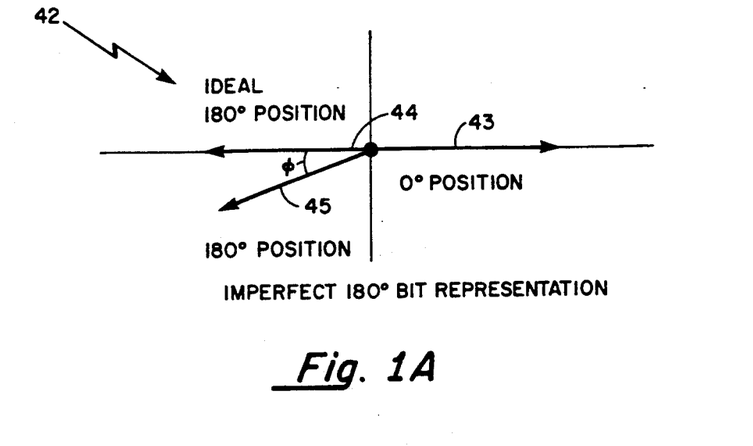
FIG. 1A is a vector diagram showing a typical phase error response of a typical conventional BPSK modulator relative to an ideal phase response.

Referring now to FIG 1A, a vector diagram 42 shows a vector 43 representing a signal having a magnitude and an absolute phase of 0°. This signal if fed to an ideal BPSK modulator would provide in one state of the modulator a signal represented by vector 44 having the same magnitude and an absolute phase of 180° whereas in a second state would provide a signal corresponding to the phase and magnitude of vector 43.

In a practical BPSK device, however, the differential phase shift deviates from perfect 180° phase shift. Further, the amplitudes of the signals or the insertion losses in the two states, are generally not equal. Vector 45 represents a signal fed to a practical 180° BPSK device having a phase shift error $\phi$ of here, 30°. These errors are generally related to the particular modulator geometries used and the frequency range over which the modulator is used. The impacts of these amplitude and phase errors may be characterized by the degree to which the carrier signal is suppressed by the BPSK modulator.

Figure 2:
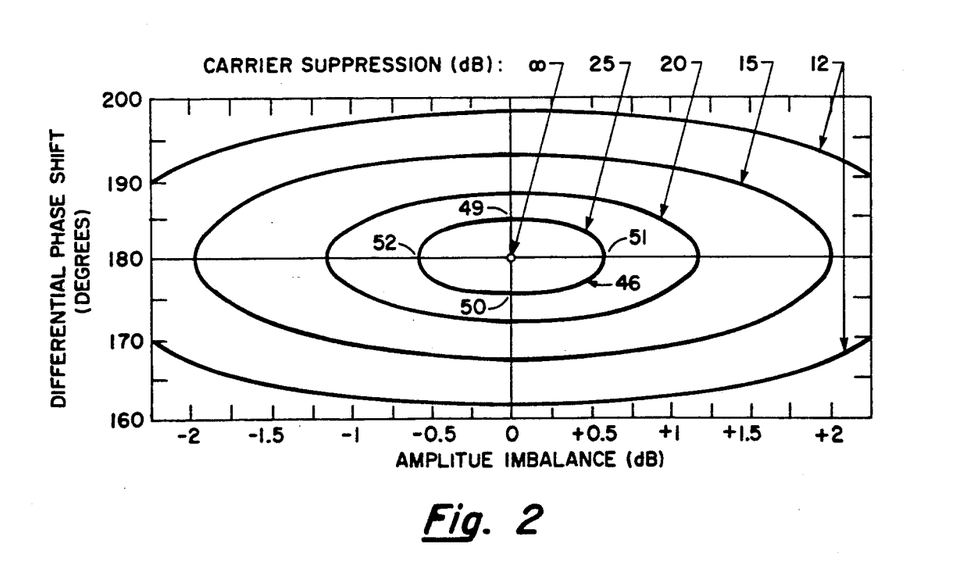
FIG. 2 is a graph of differential phase shift (in units of degrees) versus amplitude imbalance (in units of decibels) showing the relationship of carrier suppression (in units of decibels) as a function of amplitude imbalance and differential phase shift for a BPSK modulator.

Referring now to FIG. 2, a set of curves representing carrier suppression in decibels as a function of both differential phase shift in degrees about the desired 180° state and amplitude imbalance in decibels about the no-loss, 0 dB point is shown for any phase shifting circuit. The curves for carrier suppression in decibels as shown in FIG. 2 are represented by the following relationship:

$$C = \frac{2(1 + \alpha)}{\pi (1 + \alpha^2 + 2\alpha \cos\theta)^{\frac{1}{2}}}$$

where $20\log_{10}C$ = carrier suppression (dB)

$20\log_{10}\alpha$ = amplitude imbalance between the two states (dB)

$\theta$ = differential phase shift between the two states (degrees)

For example, a carrier suppression requirement of 25 dB is represented by curve 46. Points 49, 50 of curve 46 represent a differential phase shift of 180° +/−4 degrees respectively, and an amplitude imbalance of 0 dB. Moreover, points 51, 52 of curve 46 represent the instances where the amplitude imbalance is ±0.61 dB, respectively and the differential phase shift is 180°. Therefore, it can be seen that for a carrier suppression requirement of greater than 25 dB, represented by curve 46, the insertion loss balance of the two phase states must be within ±0.61 dB and the the differential phase shift must be maintained within 180°±4°.

For broadband system applications, monolithic microwave integrated circuits (MMIC) based designs for 180° bit phase shifters have insertion loss errors of as much as ±1 dB between the two phase states and the differential phase shifts can deviate from 180° by as much as ±25° over the 6 GHz-18 GHz frequency range. For many broadband applications, these errors are considered to be too large and must be minimized for improved system performance.

Figure 3A:
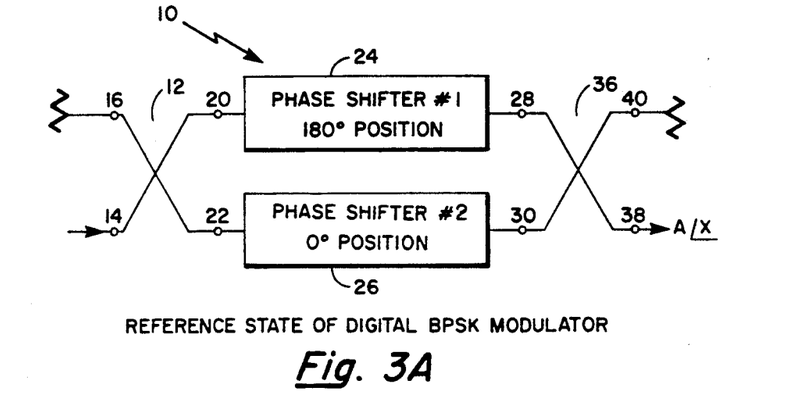
FIGS. 3A and 3C are schematic diagrams of the digital binary phase shift keying modulator of FIG. 1 in different phase states useful for understanding the invention.
Figure 3B:
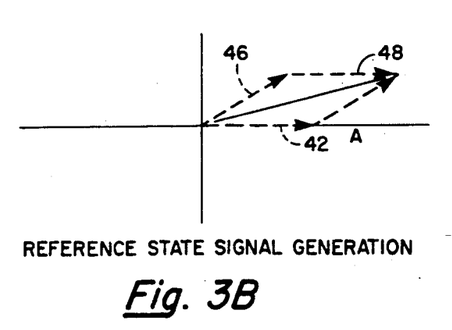
FIGS. 3B and 3D are phasor diagrams of a signal corresponding to the schematic diagram of FIGS. 3A and 3C, respectively.
Figure 3C:
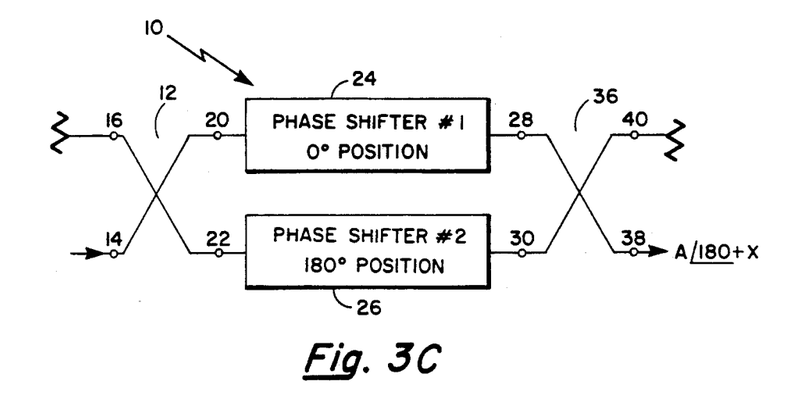

Referring now to FIGS. 3A and 3C, the binary phase shift key digital modulator 10 is shown having two imperfect 180° bit phase shifters (#1 and #2) 24, 26 disposed between two 3 dB quadrature couplers 12, 36 to provide signal dividing at the inputs and signal combining at the outputs, of the two phase shifters 24, 26. Each of the phase shifters 24, 26 is independently switchable to either its nominal 0° position or its nominal 180° position.

In understanding the operation of the BPSK modulator 10, it is useful to follow a signal fed to the circuit and observe its characteristics as it propagates through the different elements which comprise the modulator. For example, assume that a signal represented by vector 42 (FIG. 3B) having a voltage magnitude of A and an absolute phase of 0° is fed to input port 14 of divider circuit 12. For purposes of this example it is assumed that the divider 12, phase shifters 24, 26, and combiner 36 are all lossless, that is the circuits themselves do not introduce any additional loss.

One convention used by those of ordinary skill in the art for analyzing the operation of hybrid coupler circuits, such as divider circuit 12, would be to identify the output ports 20, 22 as being a "through" or direct port 20 and a "coupled" port 22. In operation, a signal entering input port 14 is evenly divided to the "through" port 20 and "coupled" port 22. An important characteristic of the circuit is that the divided signal received at "through" port 20 lags the divided signal at "coupled" port 22 by 90°. For example, if the signal received at the coupled port 22 has an absolute phase of 0°, the signal at "through" port 20 would have an absolute phase of −90°. As the signals propagate through phase shifters 24, 26 to ports 28, 30 of combiner 36 respectively, they are further phase shifted appropriately by the predetermined phase shift and state of each phase shifter 24, 26.

In establishing a reference phase state of the binary phase shift key digital modulator, phase shifter 24 is switched to its nominal 180° position and the phase shifter 26 is switched to its 0° position, as shown in FIG. 3A. The signal at port 20 would, after passing through phase shifter 24, be phase shifted by 180° and any additional phase shift error. For purposes of this example, it is assumed that both phase shifters 24, 26 have a phase shift error characteristic $\phi$ equal to 30° as depicted in FIG. 1A. It is desired that the phase shifters 24, 26 generally be fabricated using the same process such that their characteristics are very similar. For example, circuits fabricated using monolithic circuit processes offer the virtue of having low variations in electrical characteristics from unit to unit. Thus, the signal having an absolute phase angle of −90° and a voltage magnitude of $A/\sqrt{2}$ at port 20 would be phase shifted by phase shifter 24 a total of 210° to an absolute phase value at 120°. The signal having an absolute phase angle of 0° and a voltage magnitude of $A/\sqrt{2}$ at port 22 after passing through phase shifter 26 would continue to have a phase angle of 0°. The signal at port 28 in passing through combiner 36 to port 38 is phase shifted by −90°, resulting in a signal represented by vector 46, having a magnitude of A/2 and a phase angle of 30° as shown in FIG. 3B. The signal at port 30 represented by vector 42 (FIG. 3B) in passing to port 38 is not phase shifted and maintains a magnitude of A/2 and a phase angle of 0°. Thus, the two signals at port 38, when vectorially combined provide the reference state signal represented by vector 48 having a magnitude of $A/2(2+\sqrt{3})^{\frac{1}{2}}$ and at a phase angle of 15°.

Figure 3D:
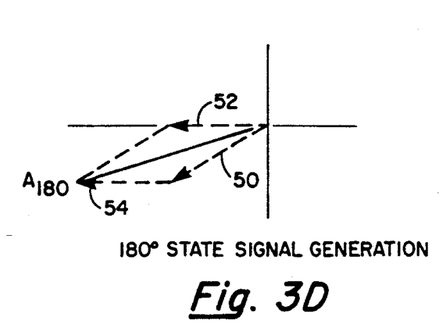

Similarly, to establish the 180° state of the proposed binary phase shift key modulator, the phase shifter 24 is now switched to its 0° position and the phase shifter 26 to its nominal 180° position, as shown in FIG. 3C. In this case, the signal having an absolute phase angle of −90° at port 20 would continue through phase shifter 24 with no additional phase shift and arrive at port 28 with an absolute phase angle of −90°. The signal at port 22, on the other hand, having an absolute phase angle of 0° would be phase shifted 180° and an additional phase error of here, $\phi = 30°$ phase error for a total phase shift of 210°. As shown in FIG. 3D, the signal, represented by vector 50 has an absolute phase angle of 210°. This signal passing through combiner 36 to port 38 is not phase shifted and maintains an absolute phase angle of 210°. The signal at port 28 having an absolute phase angle of −90° is further phase shifted by combiner 36 an additional −90° to provide a signal at port 38 represented by vector 52 having an absolute phase angle of −180° or equivalently 180°. The resultant signal, as shown in FIG. 3D, represented by vector 54, and arriving at port 38 of combiner 36, is the vector sum of vectors 50 and 52 and provides the 180° state signal having a magnitude of $A/2(1+\sqrt{3})^{\frac{1}{2}}$ at a phase angle of 195°. Recalling that the reference state signal at port 38 of combiner 36 had a magnitude of $A/2(1+\sqrt{3})^{\frac{1}{2}}$ at a phase angle of 15° it is now seen from FIGS. 3B and 3D that the reference state signal represented by vector 48 and the 180° state signal represented by vector 54 have equal amplitudes and a phase difference of 180°.

The above described operation of the BPSK modulator 10 shows that the differential phase shift is substantially independent of the amplitude and phase errors of the phase shifters 24, 26. This follows because the errors introduced by the phase shifters 24, 26 are substantially the same and are present in both the reference state and the 180° state, so that their contributions are canceled out. Therefore, the accuracy of the output signal of the modulator 10, is to a greater degree, dependent on the amplitude and phase characteristics of the divider 12 and combiner 36 networks. Were the 3 dB hybrid quadrature couplers 12, 36 ideal, the cancellation of the amplitude and phase errors from the imperfect phase shifter bits 24, 26 would result in ideal binary phase shift key operation. It is for this reason that it is generally desirable that, as mentioned earlier, the hybrid divider 12 and hybrid combiner 36 be substantially identical. As was the case with the imperfect phase shifters 24, 26, the quadrature hybrid circuits 12, 36 are desired to be fabricated from the same manufacturing process so that their electrical performance characteristics are similar. Even for practical couplers designed for very broadband operation, having coupling variations ranging from −5 dB to −2 dB, the fairly large amplitude and phase errors of the imperfect phase shifter #1 and #2 can be significantly reduced, resulting in binary phase shift key operation with significantly reduced amplitude and phase shift imbalance errors.

Although the configuration, as shown in FIGS. 3A and 3C, is based on the use of nominal 180° phase shifters, the binary phase shift keying function may be provided using any nominal N° phase shifter. The only requirement for each of the phase shifters is that they provide a non-zero differential phase shift. For any pair of N° phase shifters, the phase difference between the reference state condition and the 180° state condition will always be 180°.

However, the absolute insertion loss of the BPSK digital modulator is generally lowest when the phase shifters are selected to provide a nominal differential phase shift of 180°. This is because the phase difference between the signals fed from each phase shifter to the pair of input ports of the combiner is relatively small, when compared with the configuration using phase shifters not equal to 180°. In the example used above for understanding the operation of the modulator, a signal having a voltage magnitude of A and an absolute phase of 0° was fed to the modulator circuit. The modulator circuit in this case used a pair of 180° phase shifter where the phase shift error of each of the phase shifters $\phi$ was 30°. It was shown that the magnitude of the signal at the output of the modulator, in both the reference state and 180° state, was $A/2(2+\sqrt{3})^{\frac{1}{2}}$ or 0.9659A. It can be seen here that the phase shift error has provided some loss to the signal fed to the modulator.

Similarly, if 90° nominal phase shifters were used for the BPSK modulator and assuming that there was no phase shift error, the magnitude of the signal at the output of the modulator would be $A/\sqrt{2}$ or 0.7071 A. The loss here, due to the combination of signals having a difference in phase angle of 90° in decibels is $20 \log_{10} (0.7071)$ or 3 dB.

Figure 4:
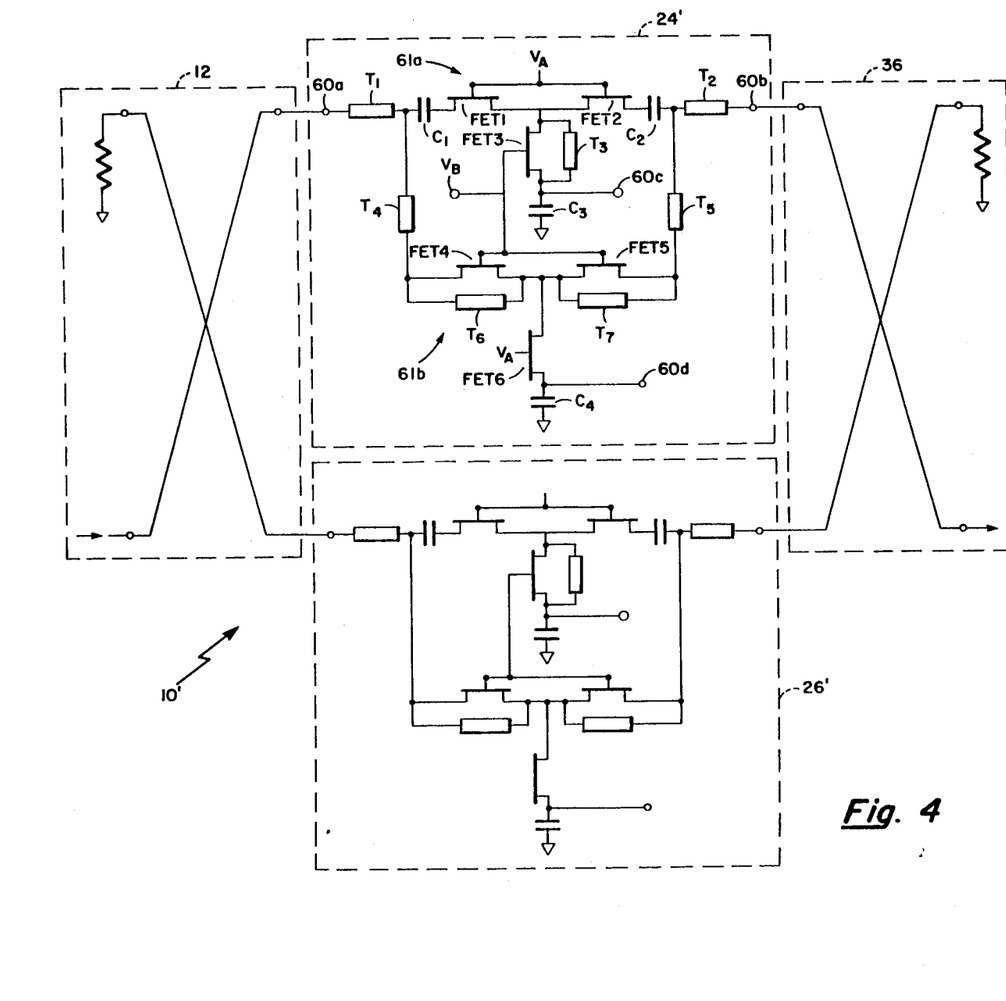
FIG. 4 is a schematic representation of one embodiment of the binary phase shift keying modulator in accordance with the present invention.

Referring now to FIG. 4, a preferred embodiment of the digital binary phase shift keying modulator 10 includes a pair of identical phase shifter circuits 24', 26' disposed between the aforementioned input quadrature hybrid divider 12 and output quadrature hybrid combiner 36 circuits, as described in conjunction with FIG. 1.

Exemplary phase shifter circuit 24', is shown to include a plurality of here six field effect transistors, here MESFETs FET1-FET6, connected in a pair of T-configurations 61a, 61b. The series elements of one T network and the shunt element of the other T network are switched from a single gate control voltage.

The pair of T-configuration networks 61a, 61b, are disposed between an input terminal 60a and output terminal 60b via transmission lines $T_1$, $T_2$, respectively. Transmission lines $T_1$, $T_2$ here provide proper impedance matching between the elements of the phase shifter circuit 24' and the quadrature hybrid networks 12, 36, respectively.

A first one of the pair of T networks 61a includes a pair of field effect transistors FET1, FET2 having respective sources and drains coupled to provide a first series path to signals fed to input terminal 60a of the phase shifter. The first one of the transistors FET1 has a drain electrode coupled to input matching transmission line $T_1$ through a first series capacitor $C_1$ and the transistor FET2 has a source electrode coupled to output matching transmission line $T_2$ through a second series capacitor $C_2$. A third field effect transistor FET3 is disposed in shunt with the firs series path with the drain electrode of the transistor FET3 coupled at the common connection of the pair of transistors FET1-FET2. A capacitor $C_3$ has a first end coupled to a source electrode of transistor FET3 and a second end coupled to ground. Further, a transmission line $T_3$ is provided in shunt to transistor FET3 having first and second ends coupled to the drain and source electrodes, respectively.

Similarly, a second one of the pair of T networks 61b includes a pair of field effect transistors FET4, FET5 for providing a second series path to signals fed to input terminal 60a of the phase shifter. The first one of the transistors FET4 has a drain electrode coupled to input matching transmission line $T_1$ through a first inductive element represented by transmission line $T_4$ and a source electrode coupled to a drain electrode of a second field effect transistor FET5. The transistor FET5 has a source electrode coupled to output matching transmission line $T_2$ through a second inductive element represented by transmission line $T_5$. A sixth field effect transistor FET6 is disposed in shunt to the second series path with the drain electrode of the transistor FET6 coupled at the common connection of the pair of transistors FET4-FET5. A capacitor $C_4$ has a first end coupled to a source electrode of transistor FET6 and a second end coupled to ground.

When the control voltage $V_A$, as applied to gate electrodes of switching transistors FET1, FET2, FET6, is zero causing such FET's to be in their conducting, low impedance states, and the control voltage as applied to gate electrodes of transistors FET3-FET5 is beyond the pinch off voltages of the field effect transistors, the phase shifter circuit 24' reduces to a pi-type high pass filter network. The pi-type filter network is provided with the pair of capacitors $C_1$ and $C_2$ in the through path between the input and output terminals 60a, 60b and high impedance inductive elements in shunt with the through path.

Conversely, in the opposite switch state, control voltage $V_B$ is equal to zero and $V_A$ has a value more negative than the device pinch-off voltage. Thus, the circuit reduces to a low pass filter network having inductive elements between the input and output terminals 60a, 60b and capacitive elements in shunt to ground.

Figure 5:
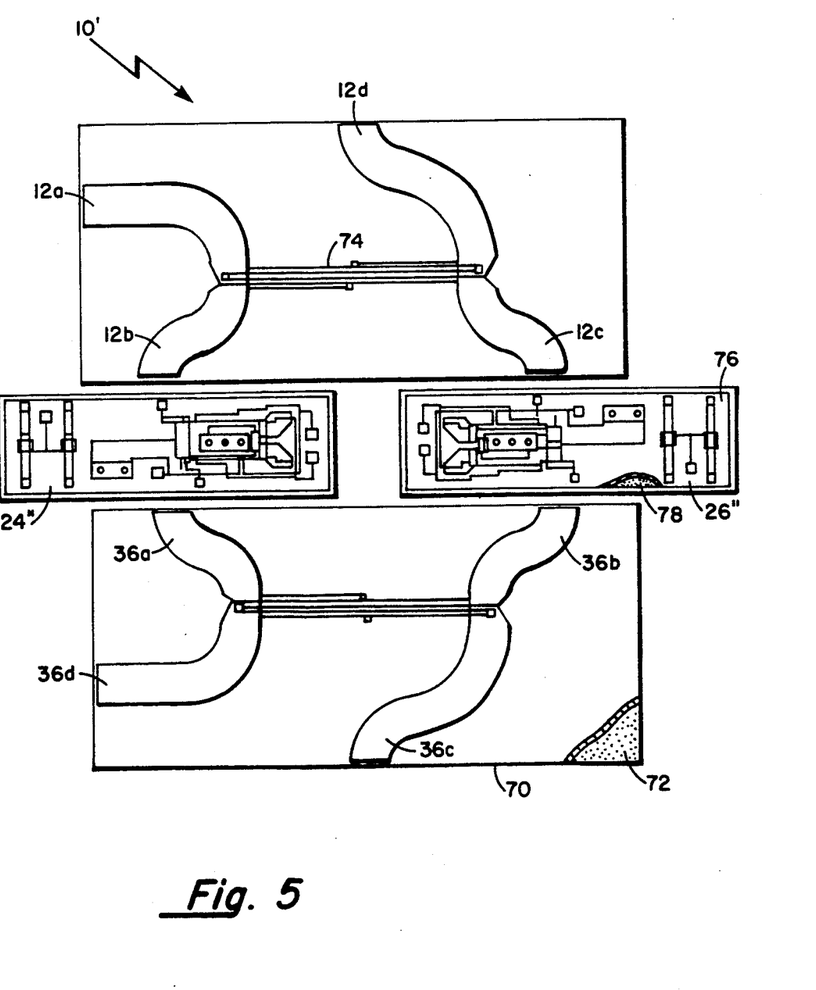
FIG. 5 is a plan view, somewhat diagrammatical, of the circuit of FIG. 4 fabricated as a hybrid circuit having microwave integrated circuit hybrid quadrature couplers and monolithic integrated circuit phase shifters.

Referring now to FIG. 5, the digital binary phase shift keying modulator 10 (FIG. 4) is shown fabricated as a combination microwave integrated circuit/monolithic microwave integrated circuit (MIC/MMIC) assembly. The BPSK modulator is shown here having the input quadrature hybrid divider 12 and the output quadrature hybrid combiner 36 fabricated as hybrid integrated circuits. The divider 12 and combiner 36 circuits are here identical and each being an interdigitated microstrip coupler disposed on a substrate 70, here comprised of alumina or other suitable dielectric material. The substrate 70 has disposed on a bottom surface portion thereof, a ground plane conductor 72. The interdigitated couplers, often referred to as Lange couplers, include a plurality of here, four parallel transmission lines 74 having alternate lines connected together via air bridges (not shown). The couplers further include input and output microstrip transmission lines 12a-12d, 36a-36d for providing transition to the coupling structures.

The phase shifter circuits, configured as the aforementioned high pass/low pass filter networks (FIG. 4) are shown fabricated as monolithic microwave integrated circuits (MMIC) 24", 26". The phase shifter circuits 24", 26" are each disposed on a substrate 76, here comprised of gallium arsenide (GaAs) or other suitable Group III-V material or other semiconductor material. The substrate 76 has disposed on a bottom surface portion thereof, a ground plane conductor 78. As mentioned earlier, a plurality of field effect transistors and lumped components are disposed on the substrate 76. The transistors and lumped components are connected to each other and to the terminals using microstrip transmission lines. The active components, namely the field effect transistors, are fabricated using ion-implantation techniques.

Typically, 180° phase shifters are used as BPSK modulators. Various configurations including switched line, reflection, loaded line, and high pass/low pass phase shifters may be used for providing the required 180° phase shift. The high pass/low pass filter phase shifter described previously in conjunction with FIGS. 4 and 5 is often used in applications where compact size and broadband performance is important. Monolithic circuit applications often use the high pass/low pass filter configuration.

Figure 6A:
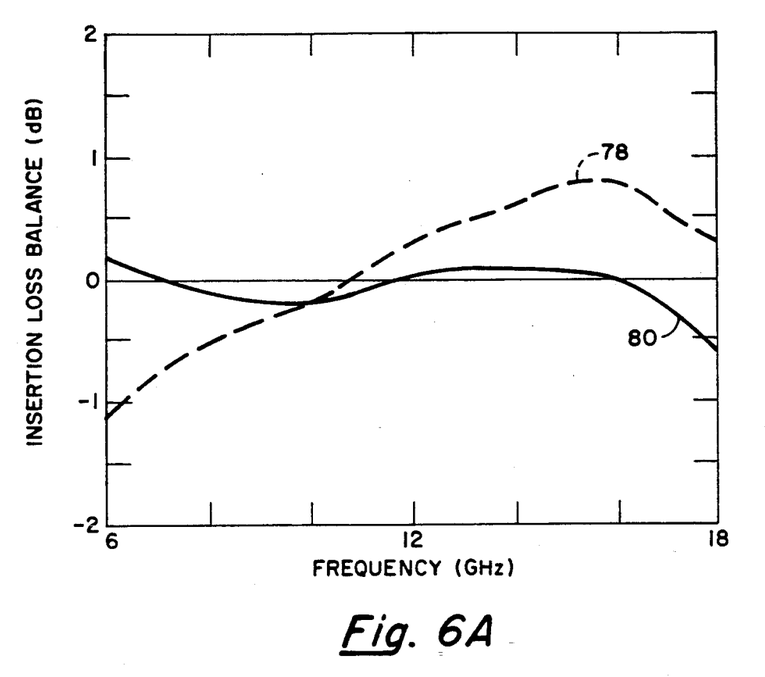
FIG. 6A is a graph of insertion loss balance versus frequency for a typical prior art BPSK digital modulator, and a typical BPSK digital modulator in accordance with the present invention.

Referring now to FIG. 6A, curve 78 represents a typical insertion loss balance characteristic (Y-axis) in units of decibels as a function of frequency in GHz (X-axis) for a typical high pass/low pass 180° phase shifter used as a digital binary phase shift keying modulator. In addition, curve 80 represents a typical digital binary phase shift keying modulator having a pair of quadrature hybrid couplers and a pair of the above-mentioned phase shifters as configured in accordance with the present invention.

Figure 6B:
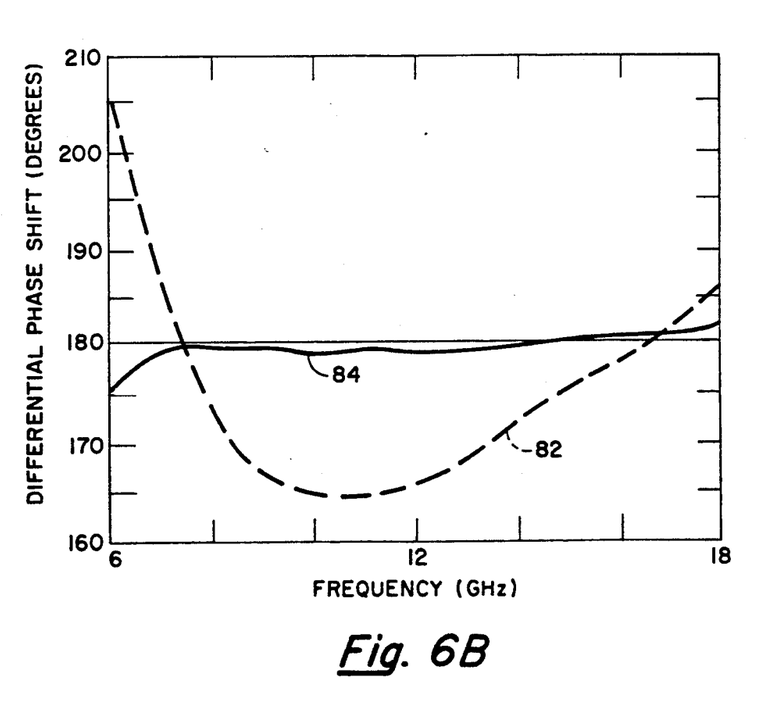
FIG. 6B is a graph of differential phase shift versus frequency for a typical prior art BPSK digital modulator, and a typical BPSK digital modulator in accordance with the present invention.

Referring now to FIG. 6B, curve 82 represents a typical differential phase shift characteristic (Y-axis) in units of degrees as a function of frequency in GHz (X-axis) for a typical high pass/low pass 180° phase shifter used as a digital BPSK modulator. In addition, curve 84 represents a typical digital BPSK modulator having a pair of quadrature hybrid couplers and a pair of the above-mentioned phase shifters as configured in accordance with the present invention. Curve 78 representing the difference in insertion loss between the two states, over the frequency range extending from 6.0 to 18.0 GHz, is shown to deviate approximately ±1 dB about the ideal 0 dB reference point. Curve 82, representing the difference in insertion phase between the two states, is shown to deviate +25/−15 degrees over the same frequency range mentioned in conjunction with curve 78.

Conversely, curves 80 and 84 representing the configuration in accordance with the present invention are shown to provide an insertion loss imbalance within about ±0.25 decibels and less than about ±3 degrees, respectively, over the same 6.0 to 18.0 GHz frequency range. The same imperfect phase shifters providing the performance characteristics of curves 78, 82, respectively, can be used together to provide a phase shift modulator having substantially improved performance as indicated by curves 80, 84.

As mentioned earlier, the binary phase shift keying function of the present invention may use any nominal N°-bit phase shifter. The various configurations previously mentioned are all viable candidates for use in providing a 180° BPSK modulator and may be more appropriate, in some applications, than the described high pass/low pass type phase shifter.

Figure 7:
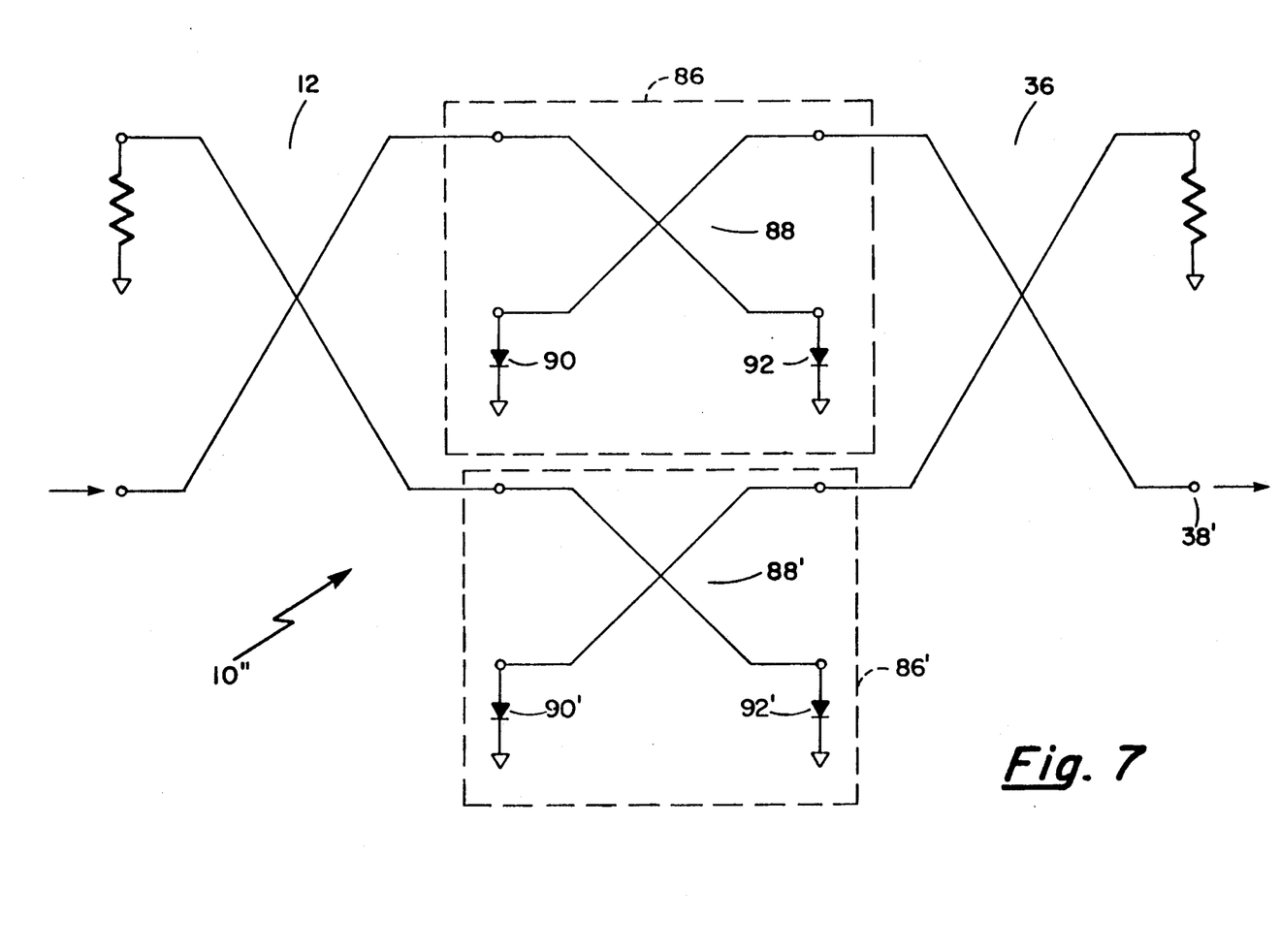
FIG. 7 is a schematic diagram of the binary phase shift keying modulator of FIGS. 3A and 3C using reflection type phase shifters.

Referring to FIG. 7, an alternate embodiment of the 180° BPSK modulator is shown to include the same quadrature hybrid divider 12 and combiner 36 as was used in conjunction with FIGS. 4 and 5. In this application, however, identical reflection-type phase shifters 86, 86' are shown disposed between the divider 12 and combiner 36 networks. One type of reflection phase shifter is shown here to include a pair of quadrature hybrid couplers 88, 88' each having a pair of PIN diodes 90, 92 and 90', 92', respectively. Each pair of PIN diodes 90, 92 and 90', 92' are independently switchable and are connected to respective coupled ports and through ports of couplers 88, 88'. To provide the required reference state, the pair of PIN diodes 90, 92 of phase shifter 86 are biased to a high impedance open circuited state while the diodes 90', 92' of phase shifter 86' are biased to a low impedance short circuited condition. To provide the 180° phase shift state, the bias conditions are reversed, that is, diodes 90, 92 are biased to the short circuit condition and diodes 90', 92' are biased to the open circuit condition. Accordingly, the differential phase shift between output signals at terminal 38' of combiner 36 for the two different bias states is 180° with respect to the reference state.

Having described a preferred embodiment of the invention, it will be apparent to one of skill in the art that other embodiments incorporating its concept may be used. It is believed, therefore, that this invention should not be restricted to the disclosed embodiment but rather should be limited only by the spirit and scope of the appended claims.

What is claimed is:

1. An RF digital phase shift modulator comprising:
   first quadrature hybrid means, having amplitude and phase characteristics for providing first and second signal paths having a differential phase shift of substantially 90°;
   first phase shifting means, disposed in said first signal path for providing a selectable different phase shift characteristic to said first signal path;
   second phase shifting means, disposed in said second signal path for providing a selectable differential phase shift characteristic to said second signal path; and
   second quadrature hybrid means, having amplitude and phase characteristics substantially the same as said amplitude and phase characteristics of said first quadrature hybrid coupled to said first and second signal paths for combining said first and second signal paths with a differential phase shift of substantially 90° therebetween.

2. The digital modulator as recited in claim 1 wherein said first and second phase shifting means, have substantially the same amplitude and phase characteristics to provide in response to a first pair of control signals a differential phase shift of 0° and N°, respectively, and in response to a second pair of control signals a differential phase shift of N° and 0°, respectively.

3. The digital modulator as recited in claim 2 wherein said first quadrature hybrid means and second quadrature hybrid means are quadrature hybrid directional couplers.

4. The digital modulator as recited in claim 3 wherein said first and second differential phase shifts (N°) are 180°.

5. The digital modulator as recited in claim 4 wherein said directional couplers have coupling values of approximately 3 decibels.

6. An RF phase shift keyed digital modulator comprising:
   a first quadrature coupler having amplitude and phase characteristics providing, first and second signal paths having a differential phase shift of substantially 90°;
   a first phase shifter disposed in said first signal path for providing a selectable differential phase shift;
   a second phase shifter disposed in said second signal path for providing a selectable differential phase shift; and
   a second quadrature coupler having amplitude and phase characteristics substantially the same as said amplitude and phase characteristics of said first quadrature coupler, coupled to said first and second signal paths for combining said first and second signal paths with a differential phase shift of substantially 90° therebetween.

7. The digital modulator as recited in claim 6 wherein said first and second phase shifters have substantially the same amplitude and phase characteristics to provide in response to a first par of control signal as differential phase shift of 0° and N°, respectively, and in response to a second pair of control signals a differential phase shift of N° and 0°, respectively.

8. The digital modulator as recited in claim 7 wherein said first and second differential phase shifts N are 180°.

9. The digital modulator as recited in claim 8 wherein said first and second quadrature couplers are Lange couplers.

* * * * *